(12) United States Patent
Binder

(10) Patent No.: US 7,200,152 B2
(45) Date of Patent: Apr. 3, 2007

(54) LOCAL AREA NETWORK FOR DISTRIBUTING DATA COMMUNICATION, SENSING AND CONTROL SIGNALS

(75) Inventor: Yehuda Binder, Hod Ha'sharon (IL)

(73) Assignee: Serconet, Ltd., Ra'Anana (IL)

( * ) Notice: Subject to any disclaimer, the term of this patent is extended or adjusted under 35 U.S.C. 154(b) by 0 days.

(21) Appl. No.: 11/190,884

(22) Filed: Jul. 28, 2005

(65) Prior Publication Data
US 2005/0259602 A1  Nov. 24, 2005

Related U.S. Application Data

(63) Continuation of application No. 09/349,020, filed on Jul. 7, 1999, now Pat. No. 6,956,826.

(51) Int. Cl.
*H04L 12/00* (2006.01)

(52) U.S. Cl. ...................................... 370/463; 370/254

(58) Field of Classification Search ................ 370/463, 370/254, 200, 222; 710/107; 379/413
See application file for complete search history.

(56) References Cited

U.S. PATENT DOCUMENTS

| | | | |
|---|---|---|---|
| 3,943,283 A | | 3/1976 | Caragliano et al. |
| 4,495,617 A | | 1/1985 | Ampulski et al. |
| 4,803,485 A | | 2/1989 | Rypinski |
| 4,807,149 A | | 2/1989 | Mehnert |
| 4,918,690 A | | 4/1990 | Markula et al. |
| 4,937,811 A | * | 6/1990 | Harris ........................ 370/200 |
| 5,095,417 A | | 3/1992 | Hagiwara et al. |
| 5,124,990 A | | 6/1992 | Williamson |
| 5,144,305 A | | 9/1992 | Gotz et al. |
| 5,579,486 A | * | 11/1996 | Oprescu et al. ............. 710/107 |
| 5,680,405 A | | 10/1997 | Pesetski et al. |
| 5,706,278 A | * | 1/1998 | Robillard et al. ........... 370/222 |
| 5,841,360 A | | 11/1998 | Binder |
| 5,875,210 A | | 2/1999 | Brief et al. |
| 5,946,321 A | | 8/1999 | Dean |
| 6,075,438 A | | 6/2000 | Abe et al. |
| 6,115,468 A | * | 9/2000 | De Nicolo .................. 379/413 |
| 6,480,510 B1 | | 11/2002 | Binder |

\* cited by examiner

FOREIGN PATENT DOCUMENTS

| | | |
|---|---|---|
| WO | PCT 96 37984 | 11/1996 |
| WO | WO 96 37984 | 11/1996 |

*Primary Examiner*—Edwin C. Holloway, III
(74) *Attorney, Agent, or Firm*—Browdy and Neimark, PLLC

(57) ABSTRACT

A network for carrying out control, sensing and data communications, comprising a plurality of nodes. Each node may be connected to a payload, which comprises sensors, actuators and DTE's. The network is formed using a plurality of independent communication links, each based on electrically-conducting communication media comprising at least two conductors and interconnecting two nodes, in a point-to-point configuration. During network operation, nodes can be dynamically configured as either data-generating nodes, wherein data is generated and transmitted into the network, or as receiver/repeater/router nodes, wherein received data is repeated from a receiver port to all output ports. During normal network operation, the network shifts from state to state. Each state is characterized by assigning a single node as the data-generating node, and configuring all other nodes in the network as repeaters and receivers. The network can be configured in linear or circular topology, or any mixture of both. The nodes and the payloads can each be powered by local power supply or via the network wiring. In the latter case, dedicated wires can be used, or the same conductors may be employed for both power distribution and communication. Network control can be performed external to the network, or by using the network itself as transport for control messages. Shifting from state to state can be done by selecting sequential nodes to be the data-generating node, or by selecting arbitrary nodes to be the data-generating node.

65 Claims, 8 Drawing Sheets

| Node State | SW1 | SW2 | SW3 | SW4 |
|---|---|---|---|---|
| Right-to-left | OFF | ON | Don't Care | 3 |
| Left-to-right | ON | OFF | 1 | Don't Care |
| Transmit both sides | ON | ON | 2 | 1 |
| Receive both sides | OFF | OFF | Don't Care | Don't Care |
| Transmit right Receive left | ON | OFF | 2 | Don't Care |
| Transmit left Receive right | OFF | ON | Don't Care | 2 |
| Transmit/receive both sides | ON | ON | 2 | 2 |

FIG. 12.

LOCAL AREA NETWORK FOR DISTRIBUTING DATA COMMUNICATION, SENSING AND CONTROL SIGNALS

This is a continuation of parent application Ser. No. 09/349, 020 filed Jul. 7, 1999, now U.S. Pat. No. 6,956,826.

FIELD OF THE INVENTION

The present invention relates to the field of wired communication and control networks, and, more particularly, to local area networks and networks used for sensing, communication, and control.

BACKGROUND OF THE INVENTION

Local area networks (LANs) for distributing data communication, sensing, and control signals are often based on a "bus" topology, as shown in FIG. 1. Such a network 10 relies on shared electrically-conducting communication media 1, usually constituted by a twisted-pair of electrical conductors or a coaxial cable. Network data terminal equipment (DTE) units 5, 6, and 7 are connected via respective network adapters 2, 3, and 4 to communication media 1. Network adapters 2, 3, and 4 function as data communication equipment (DCE) units, and are tapped into communication media 1, forming parallel electric connections, and thereby interface between DTE units 5, 6, and 7 and communication media 1. Such network adapters are also commonly referred to as "NIC", an example of which is the Network Interface Card IEEE 802 (Ethernet). Such a topology is commonly used for connecting personal computers (PCs) in a network. Network adapters can be stand-alone units, integrated into the DTE unit or housed therewith in a common enclosure.

Control networks, interconnecting sensors, actuators, and DTE's also commonly use the same topology, such as the network described in U.S. Pat. No. 4,918.690 (Markkula, Jr. et al.) and shown in FIG. 2. In a network 20, network adapters 22, 23, and 24 function as DCE's, but are commonly referred to as "nodes". The payloads 25, 26, and 27 are composed of sensors, actuators, and DTE's.

Hereinafter, the term "node" is used for both control and data-communication applications.

A topology (such as bus topology) whose physical layer communication media employs multi-point connections, is not optimal for communication, and exhibits the following drawbacks:

1. The maximum length of the communication media is limited.
2. The maximum number of units connected to the bus is limited.
3. Complex transceivers are required in order to interface the communication media.
4. The data rate is limited.
5. Terminators are required at the communication media ends, thus complicating the installation.
6. At any given time, only single connected unit may transmit; all others are receiving.
7. In case of short circuit in the bus, the whole network fails. Localizing the fault is very difficult.

Despite these drawbacks, however, bus topology offers two unique advantages:

1. If the application requires "broadcast" data distribution, where the data generated by a given node must be distributed to all (or a majority of) the nodes in the network, network operation is very efficient. This is because only a single network operation is required (i.e., to establish which node is the transmitter). The broadcast data is received by all other nodes in the network in parallel without additional network overhead.
2. The broadcast message is received simultaneously by all receiving nodes in the network. This is important in real-time control applications, for example, where orderly operation of the units must be maintained.

The communication-related drawbacks described above are solved by networks constructed of multiple communication links, wherein each instance of the link communication media connects only two units in the network. Here, the physical layer in each segment is independent of other links, and employs a point-to-point connection. Data and/or messages are handled and routed using data-link layer control. One example of such system for LAN purposes is the Token-Ring, described in the IEEE 802 standard. An example of a corresponding control network is described in U.S. Pat. No. 5,095,417 to Hagiwara et al. Both networks use circular topology ("ring topology") as illustrated in FIG. 3. A network 30 interconnects nodes (or NIC's) 32, 33, and 34 by three separate cables 31A, 31B, and 31C, each connecting a pair of nodes and forming three distinct physical layer communication links. Payloads (or DTE's) 35, 36, and 37 are respectively connected to the appropriate nodes.

Both the Hagiwara network and the Token-Ring network use unidirectional communication in each communication link and require a circular topology. The PSIC network described in U.S. Pat. No. 5,841,360 to the present inventor teaches a similar network where the use of a circular topology is optional, and bi-directional communication (either half-duplex or full-duplex mode) is employed in the communication links.

The above-mentioned prior art patents and networks are representative only. Certain applications are covered by more than one issued patent. Additional discussion concerning the above-mentioned topologies can be found in U.S. Pat. No. 5,841,360 entitled. "Distributed serial control system" which issued Nov. 24, 1998 and co-pending U.S. patent application Ser. No. 09/123,486 filed Jul. 28, 1998, both in the name of the present inventor, and incorporated by reference for all purposes as if fully set forth herein.

Networks such as those illustrated in FIG. 3 typically use a "store and forward" mechanism, wherein the data received at a specific node is decoded at least to the data-link layer, and then re-encoded and transmitted to another point in the network as determined by the network control. This use of point-to-point communication links eliminates the communication drawbacks enumerated above in broadcast-based networks, but it lacks the two unique advantages of the broadcast technology, as also previously enumerated. Because the data is not inherently distributed throughout a network based solely on point-to-point communication links, such a network incurs a heavy overhead when broadcast is needed and exhibits delays in the propagation of messages. The overhead and delays result from the need to decode and re-encode messages at each node.

There is thus a widely-recognized need for, and it would be highly advantageous to have, a means of implementing a network which allows for both improved communication characteristics, while also supporting broadcast discipline and fast message distribution along the network.

SUMMARY OF THE INVENTION

It is an object of the present invention to provide a local area network in which at least some of the drawbacks described above are reduced or eliminated.

To this end, the present invention provides a local area network based on nodes connected to payloads. The nodes are interconnected to form a network of half-duplex or full-duplex communication links based on electrically conducting communication media such as twisted conductor pairs or coaxial cables. Each communication link interconnects two nodes in the network. Each node is capable of being dynamically configured as a transmitter or as a receiver. In addition, however, each receiving node can also be dynamically configured to be a repeater, which simply retransmits the received data. In this way, data from one link can be repeated to all other links via an automatic multicast process. In normal operation, a specific node is selected as the data generating unit to transmit data to the network. All other nodes serve as repeaters and receivers, and hence the data is multicast instantaneously from the selected data generating node throughout the network. After completing this transmitting session, another node may be selected as the data generating node, with all other nodes serving as repeaters and receivers in a like fashion.

A network according to the present invention can also be configured in a circular topology, enabling operation to continue even when there is a malfunction or loss of a communication link.

Therefore, according to the present invention there is provided a local area network for distributing data communication, sensing, and control signals, the local area network including at least three nodes having an operational mode and interconnected by at least two distinct communication links according to a topology, wherein: (a) each of the communication links has at least two electrical conductors; (b) each of the communication links connects two of the nodes in a point-to-point configuration; (c) each of the communication links is operative to communicating in a half-duplex mode; (d) at least one of the nodes is connected to a payload; (e) at least two of the nodes have the operational mode selectable as a data-generating operational mode; (f) at least one of the nodes has the operational mode selectable as a repeating operational mode; and wherein the local area network has a state selectable from a group of at least two distinct states, wherein each state is characterized by having a single selected one of the nodes in the data-generating operational mode, with the remainder of the nodes in operational modes selected from a group containing the receiving operational mode and the repeating operational mode.

BRIEF DESCRIPTION OF THE DRAWINGS

In order to understand the invention and to see how it may be carried out in practice, some preferred embodiments will now he described, by way of non-limiting example only, with reference to the accompanying drawings, in which:

FIG. 12 describes various possible node states, and the respective required switches states for a node as shown in FIG. 10.

DESCRIPTION OF THE PREFERRED EMBODIMENTS

Figure 1:
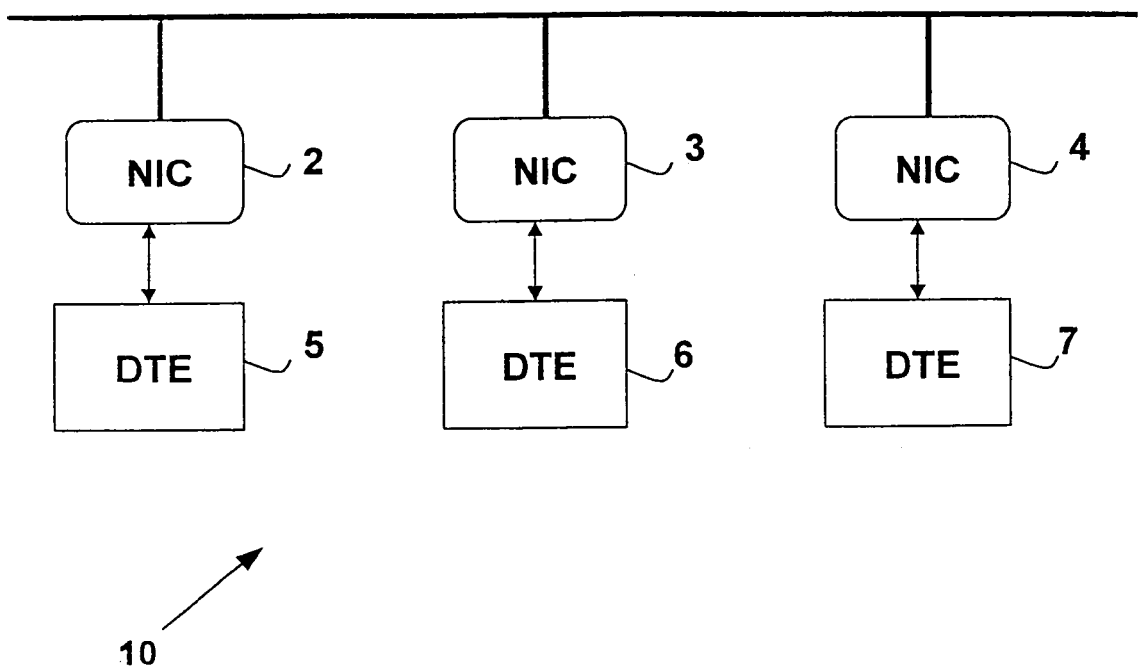
FIG. 1 shows a prior-art LAN for data communication, employing bus topology.
Figure 2:
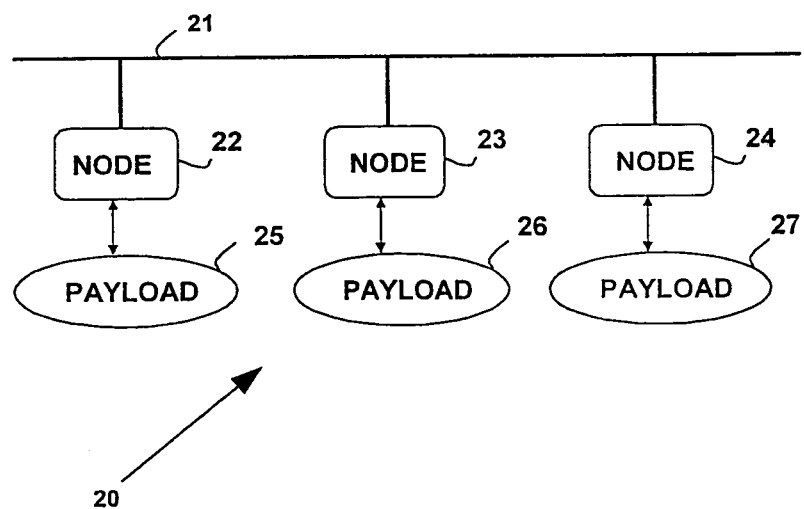
FIG. 2 shows a prior-art LAN for control, employing bus topology.
Figure 3:
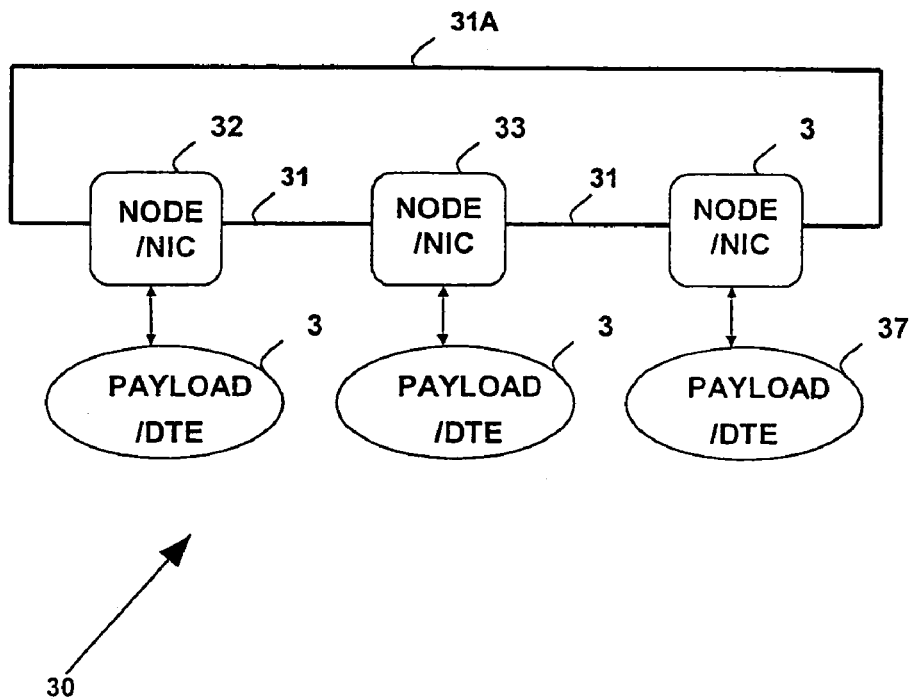
FIG. 3 shows a prior-art network for control or data-communication, employing circular topology.

The principles and operation of a network according to the present invention may be understood with reference to the drawings and the accompanying description. The drawings and descriptions herein are conceptual only. In actual practice, a single circuit can implement one or more functions; alternatively, each function can be implemented by a plurality of components and circuits. In the drawings and descriptions, identical reference numerals indicate those components that are common to different embodiments or configurations.

Figure 4:
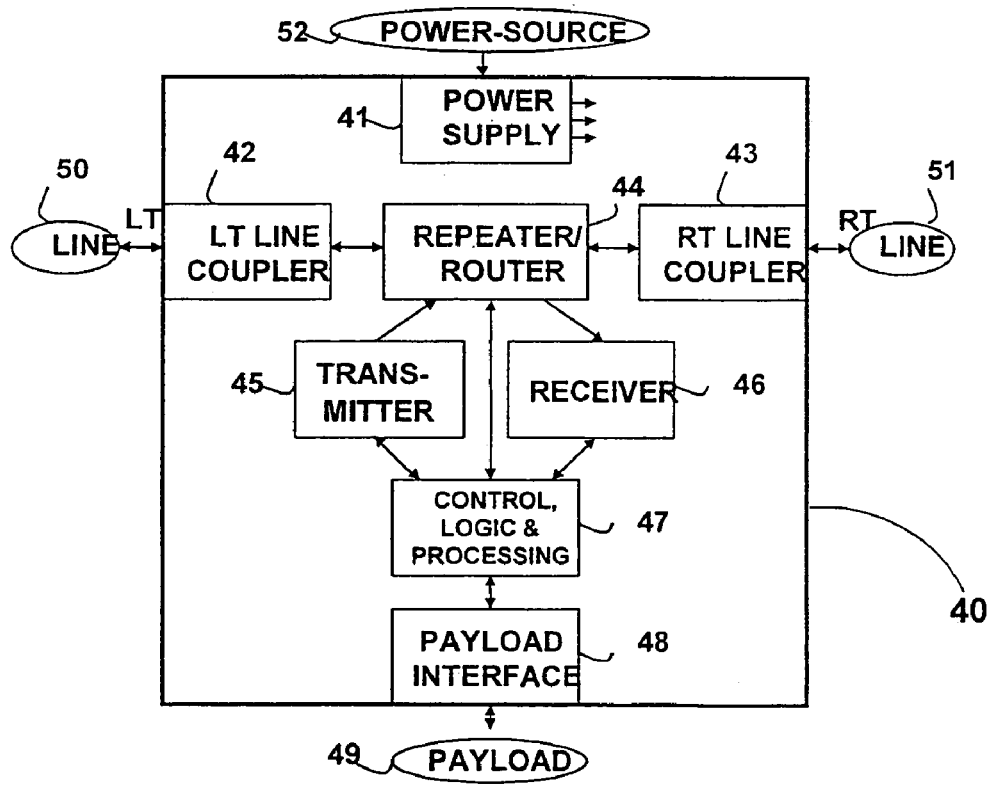
FIG. 4 describes a general block diagram of a node according to the present invention.

FIG. 4 schematically shows a node 40 according to the present invention. Node 40 contains the following functional blocks:

A power supply 41, fed from a power source 52, which converts incoming power to the voltage, or voltages, required by the node and the node's components. In addition, power supply 41 may also feed a payload 49 connected to node 40. If used, this feeding function is carried out by a payload interface 48. (For clarity, FIG. 4 omits the individual connections distributing power from power supply 41 to the power-consuming blocks of node 40.)

A payload interface 48 which adapts node 40 to a specific payload 49. Various payload types can be employed, such as sensors, actuators and data units, either analog or digital, functioning either as output or as input. For example:

Analog sensor. The payload consists of analog sensor used to measure any physical phenomena. In most cases, the payload interface contains an A/D converter.

Digital sensor. The payload is a switch, button, etc.

Analog actuator. In most cases, the payload contains a D/A converter controlling the parameters of the analog actuator.

Data related unit. In the case of digital communication, the payload consists of DTE and the payload interface contains a DTE interface.

Non-digital data. Data such as video, voice, analog communication or any other of data type. If analog data is input to the node, the payload interface is likely to use an A/D converter.

The above examples are not intended to limit in any way the general payload definition. Furthermore, multiple devices of various types can be used. In some cases, payload 49 may use power from node 40. For example, the excitation voltage to analog sensor may be driven from the node power.

Some nodes in the network may not be connected to a payload, or may not have any payload interface at all. Nodes configured in this manner would be used as repeaters only, such as a node 90 in FIG. 8. Repeater nodes can be used, for example, to extend the distance between nodes beyond the regular limit.

Line couplers 42 and 43, which interconnect node 40 with up to two other nodes, each via communication media 50 and 51, respectively (also referred to as "lines"). Each communication media supports communication between two nodes of the network. For clarity only, the two ports are designated 'Left'-LT and 'Right'-RT. The right connection RT uses line 51 and connects via RT line coupler 43. Similarly, the left connection LT uses line 50 and connects via LT line coupler 42. Neither line coupler 42 nor line coupler 43 affects the communication signal. Line couplers may include connectors, protection devices, isolation (e.g. transformer) and other required functions, which are not normally associated with the communication signal itself.

A transmitter 45, which deals with the data to be transmitted, except for the physical layer functions (according to the OSI interconnection model). This block can be implemented in hardware (CRC generation circuitry, for example) by software, or by both hardware and software.

A receiver 46, which deals with the received data except for the physical layer functions (according to the OSI interconnection model). This block can be implemented in hardware (CRC error detection circuitry, for example), by software, or by both hardware and software.

A control, logic, and processing unit 47, which controls and monitors node 40 and network operation. This block interconnects with the controlled blocks in node 40 (for clarity, some lines are omitted from FIG. 4). In addition, control, logic, and processing unit 47 can process data in the network, and also deals with the payload via payload interface 48. Control, logic, and processing unit 47 is furthermore in charge of shifting a repeater/router 44 from one state to another, as detailed below.

Repeater/router 44 deals with the physical layer characteristics of the communication signal. The repeater/router can be in various states, including a receive-only state and a transmit-only state. The signal is encoded and decoded, and is routed according to the control signals from control, logic, and processing unit 47. Detailed explanation of the repeater/router 44 follows.

A node can be stand-alone or integrated into the payload. For example, in the case of personal computer, the node can be housed within the computer enclosure as an add-on card.

Figure 5A:
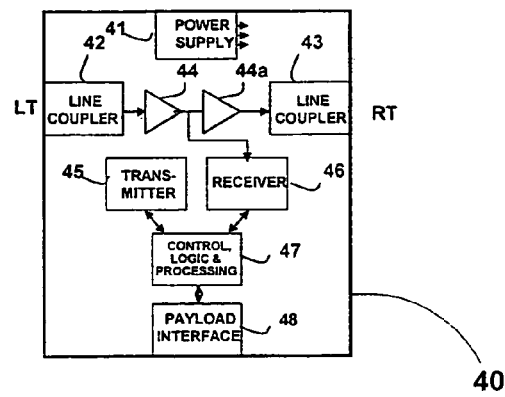
FIGS. 5a, 5b, 5c, and 5d show different possible states of a node according to the present invention.
Figure 5B:
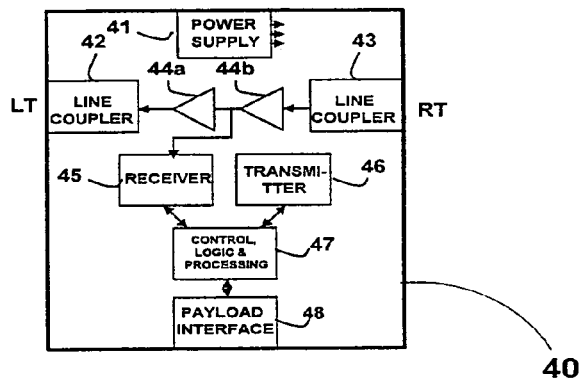

FIGS. 5a and 5b describe the various repeater/router functions by means of the possible states of a repeater/router during normal operation. As shown in FIG. 5a, repeater/router 44 contains two units connected in series. A line receiver 44b decodes the communication signal in the line into a digital signal which is fed to receiver 46 for analyzing the data-link and higher OSI layers. The digital signal is then fed to a line driver 44a which encodes the communication signal again. The pair consisting of line receiver 44b and line driver 44a thus form a communication signal repeater which performs a transparent routing of the communication signal from 'left' to 'right'. The delay between input and output is negligible, in the order of nano-seconds or micro-seconds.

Similarly, FIG. 5b allows for a routing from 'right' to 'left'. The direction of repeater/router 44 is controlled by control, logic, and processing unit 47, via control lines (omitted for clarity from FIG. 5).

Figure 5C:
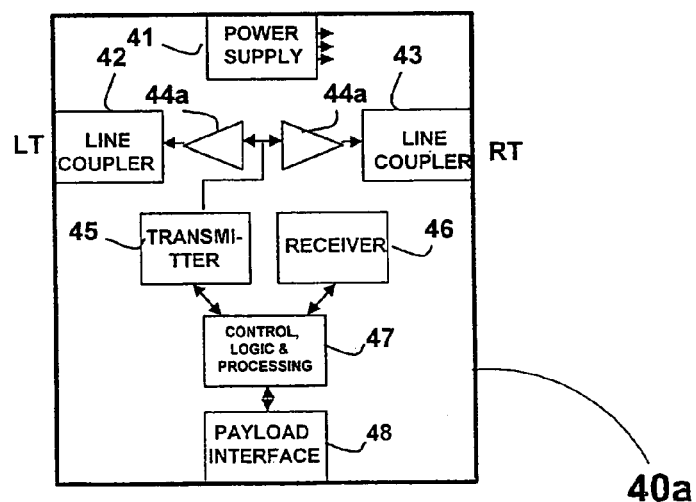
Figure 5D:
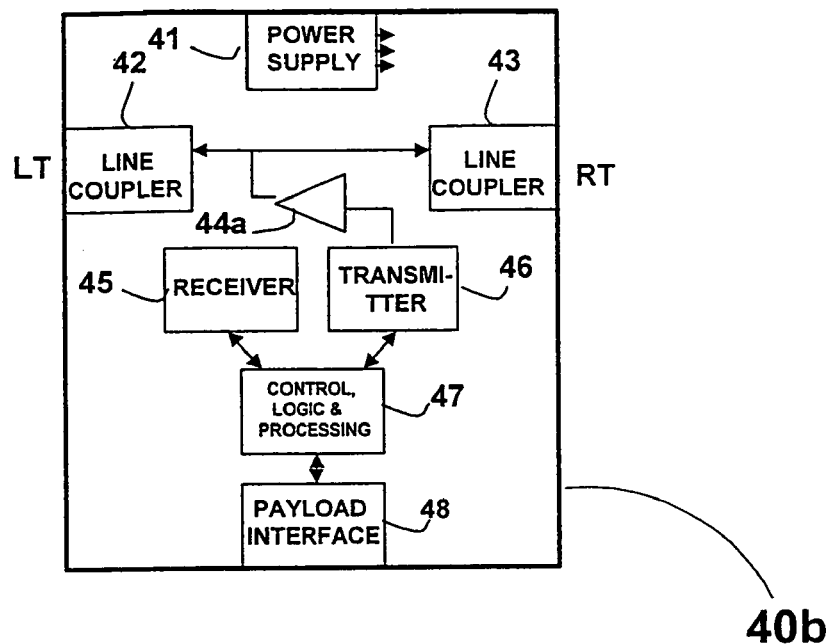

Whereas FIGS. 5a and 5b describe a node which does not generate any data (but only receives and transfers the data in the network), FIGS. 5c and 5d illustrate nodes in the transmitting state. In both cases, the node transmits data to both the right and left connections via the respective line coupler. In FIG. 5c, two line drivers 44a are used, one for each direction. In FIG. 5d, a single line driver 44a is used, driving both directions from a single unit. Both embodiments can be used interchangeably. In most cases, the line driver and line coupler characteristics will be the basis for selecting one configuration in preference over the other. For example, if the line driver is capable of driving a single line only, the configuration of FIG. 5c should be used.

Figure 6:
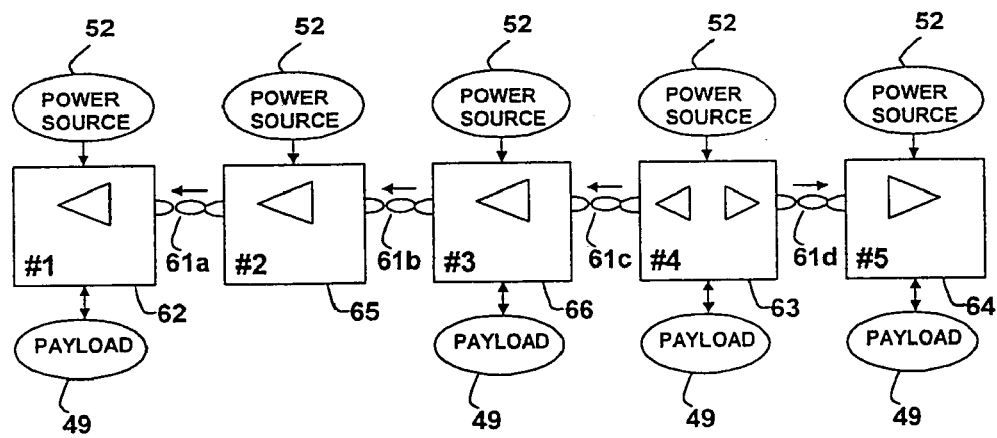
FIG. 6 shows a state of a network according to the present invention.

FIG. 6 shows a network 60 according to the present invention. Electrically-conducting communication media of lines 61a, 61b, 61c, and 61d are used to interconnect the nodes. At least two conductors are used in the communication media. For example, coaxial cables or copper twisted-pairs may be used. For clarity only, the figures herein illustrate the use of a single twisted-pair in non-limiting examples.

Nodes 62, 63, 64, 65 and 66 are all the based on node 40 as described previously. Nodes 62, 65, and 66 are in 'Right to Left' state as illustrated in FIG. 5b, whereas node 64 is in 'Left to Right' state, as illustrated in FIG. 5a. Node 63 is the data generating node as in FIGS. 5c and 5d. The network in FIG. 6 shows one possible state of the network, wherein node 63 is the data-generating node, while all other nodes serve as receivers and repeaters, receiving the data and re-transmitting the data to the next sequential node. In order to support dynamic reconfiguration, nodes can simultaneously have more than one operational mode. In a non-limiting fashion, a node can have:

a data-generating operational mode, wherein a node functions as a source of data, and transmits this data to other nodes;

a receiving operational mode, wherein the node receives data from another node; and a repeating operational mode, wherein the node functions as a repeater of data received from one given node by re-transmitting this data to another given node.

While the network is functioning, the current operational mode of a node is selectable from the available operational modes. Some operational modes may be mutually exclusive, while others may be selected simultaneously. For example, the data-generating operational mode is exclusive of the repeating operational mode, whereas the receiving operational mode may be selected at the same time as the repeating operational mode.

In most applications, more than one node can serve as a data-generating node at different times. In such a case, the network states will be changed as a function of time according to predetermined logic and control, in order to allow each data generating node an opportunity to transmit. However, no more than a single node can serve as data-generating node at a time. While a node is serving as data-generating node, all other nodes states are accordingly set to be repeaters and/or receivers, to allow for data distribution along the network. Nodes located 'left' of the data generating node will be in a 'right to left' state, while nodes located 'right' of the data-generating node will be in a 'left to right' state.

It should be clear that, whereas the nodes at the network ends, the 'left-most' node 62 and the 'right-most' node 64 could use the same structure as shown in FIG. 4 (and can be implemented in the same way as all other nodes in the network), the end nodes utilize only single line connection. Thus these end nodes can be implemented using a single line coupler and single line driver.

It should also be clear that one or more of the nodes in the network need not be connected to a payload, as is illustrated for node 65 in FIG. 6. This may be the case where the attenuation in the line is too high (e.g. a line is too long), and a node serves mainly as a repeater. In such a case, payload interface. 48 would not be required.

Network Powering

Figure 8:
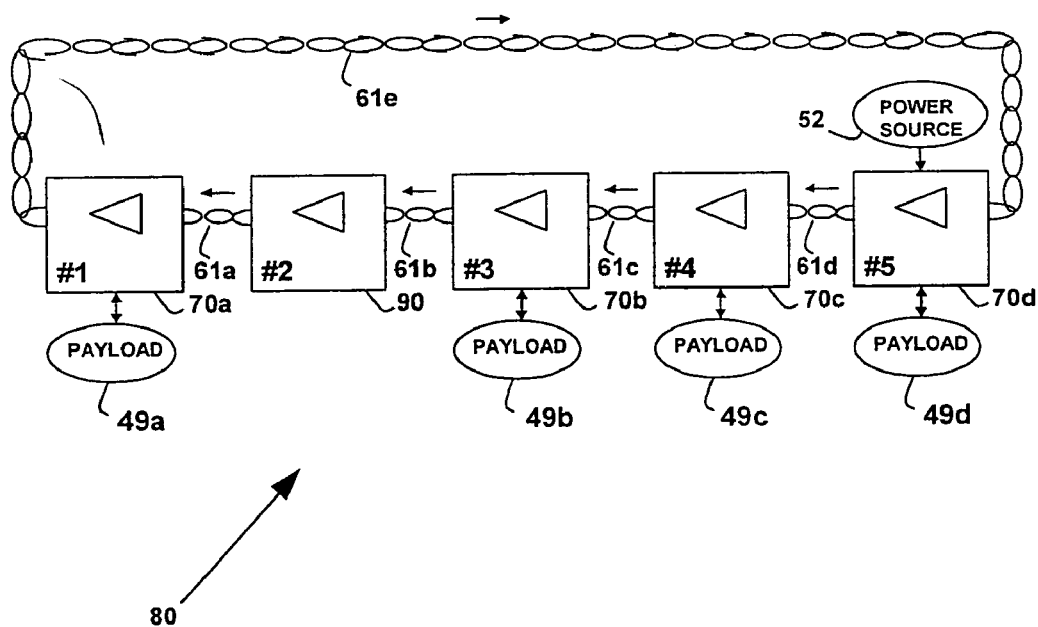
FIG. 8 shows a state of a network according to the present invention, wherein power is carried by the network and employing circular topology.

FIG. 6 illustrates a network wherein each node is locally powered by a local power source 52, which supplies electrical power for operating the components of the network. Alternatively, the network communication media can be used for power distribution. In one embodiment of the present invention, the power is distributed via dedicated lines, such as by the use of two additional wires within the same cable. In a preferred embodiment, the same wires can be used for both data communication and power distribution. The latter configuration is described in co-pending U.S. patent application Ser. No. 09/141,321, filed by the present inventor on Aug. 27, 1998, which is applicable to the network discussed herein and incorporated by reference. FIG. 8 illustrates such a network, allowing for single power-supply to be used for powering the whole network.

Figure 7:
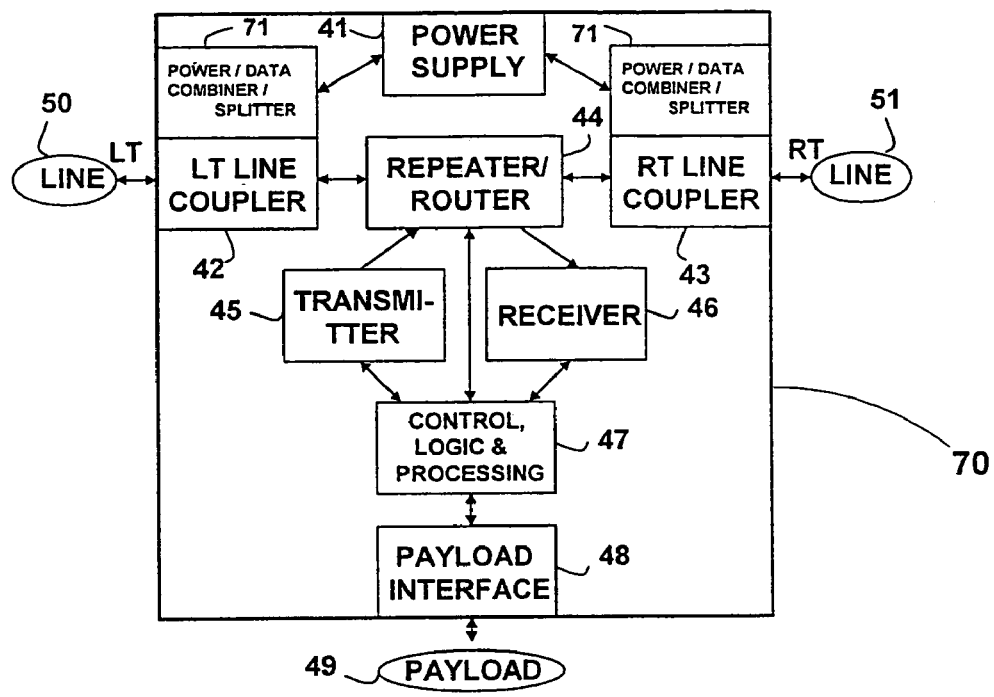
FIG. 7 shows a general block diagram of a node according to the invention, wherein power is also carried by the network.

When the same wires are used for both communication and power, the node 40 should be modified to include a power/data combiner/splitter 71 as shown in FIG. 7. A node 70 is shown with two power/data combiner/splitters 71 coupled to line couplers 42 and 43. A node such as node 70 can receive power from either the left or the right sides or from both sides, and carry the power to the non-powered side. Being powered from the network, no power source interface will be usually supported for such a configuration. The power source feeding the network can connect thereto via dedicated couplers or via one or more of the nodes, modified to support such capability.

Circular Topology.

Figure 9A:
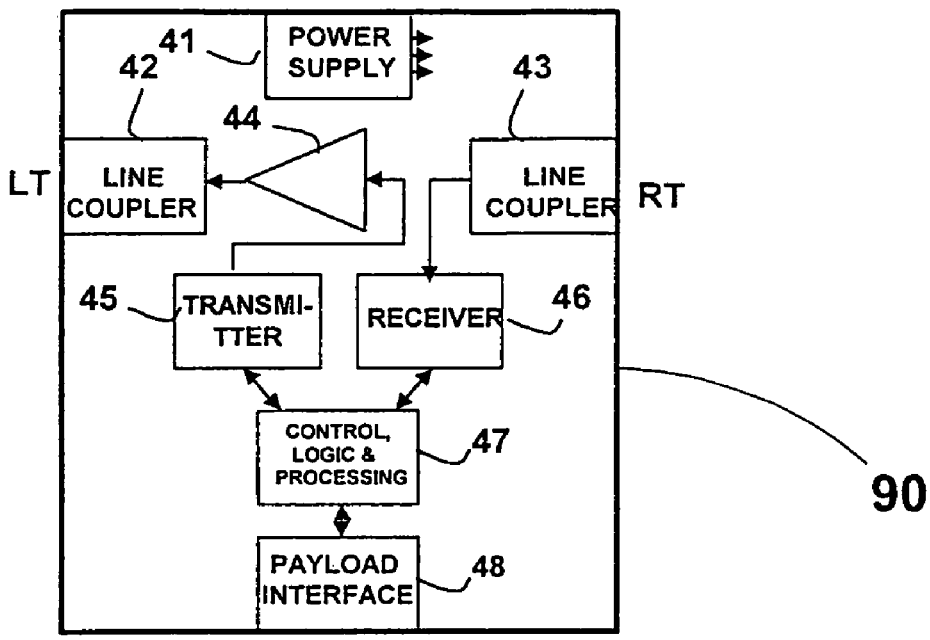
FIGS. 9a and 9b show different possible states of a node in circular topology network according to the present invention.
Figure 9B:
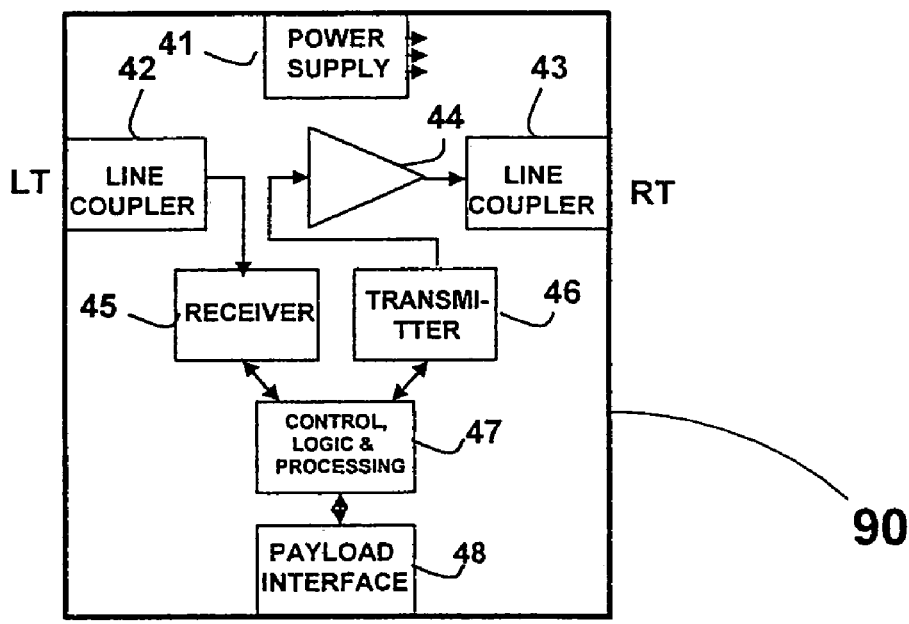

While the foregoing description applies the present invention to a linear topology, the present invention can also be implemented using a circular topology for 'ring' type networks. In one embodiment, both ends of the network are connected to a node which is configured to receive from both sides, hence including two receivers. However, FIG. 8 shows a preferred embodiment of a network 80. In network 80, all nodes except the data-generating node are configured to the transparent repeater state, either uniformly 'right-to-left' or uniformly 'left-to-right'. A node 90 in the data-generating state is modified as illustrated in FIGS. 9a and 9b. Node 90 can transmit to one side and receive from the other. In FIG. 9a node 90 can transmit to the left side and receive from the right side. Similarly, in FIG. 9b node 90 can transmit to the right side and receive from the left side. Either state can be used in circular topology. In FIG. 8, node 90 is in the state shown in FIG. 9a. Alternatively, node 90 can be in the state shown in FIG. 9b. All other nodes of FIG. 8 are configured in the 'right-to-left' direction. In both cases, the data-generating node 90 transmits to one side and receives from the other. The receiving functionality of node 90 can be used for monitoring the network, to insure that the data path is available and is error-free. However, this receiver functionality is an option only, and does not have to be implemented.

For compactness, FIG. 8 demonstrates both the power feeding via the network and the circular topology together, but these features are independent and may be implemented separately.

Network Control.

As described above, the operation of the network (either bus or circular topology) switches from state to state. Each state is characterized by having a specific node functioning as data-generating node at a time, while all other nodes serve as repeaters and receivers, routing the data coming from the data-generating node. Hence, there is a need for a network controller to determine which node in the network will be the data-generating node.

Various techniques can be used to implement such a network controller. The network controller can select nodes sequentially, by means of token passing from node to node (similar to that of the Token-Ring network). The network controller can be external to the network, using dedicated communication media. Preferably, the network controller will be embedded and will manage the network states via signals transported by the network itself. In most cases, each node should be allocated an address, enabling data routing in the network from arbitrary node to arbitrary node.

Another popular method of network discipline is 'master/slave' operation. In another embodiment of the present invention, one of the nodes will be designated as the master node. In the initial state, this node serves as the data-generating node, and while in this state directs other nodes to transmit. During the following state the selected node will serve as the data-generating node. This two-state sequence will be repeated, with a different node selected to be the data-generating node in each subsequent cycle, according to predetermined logic or under external control.

Dual Discipline Network.

The network taught by U.S. Pat. No. 5,841,360 to the present inventor, herein referred to as the "PSIC Network", employs multiple communication links, independent of each other. Such a network supports several features which are not available in the previously-described network, such as automatic addressing, fault localization, and circular topology redundancy in the case of single failure.

In order to exploit the benefits of both these network types it is possible to construct a network which supports both disciplines and can be controlled to be either in one discipline or in the other. For example, the network may start as PSIC Network. During this start-up period, automatic addressing and fault. localization will be performed. Thereafter, the network may configure itself to work according to this application or may use time-sharing and alternately switch between both configurations.

Figure 10:
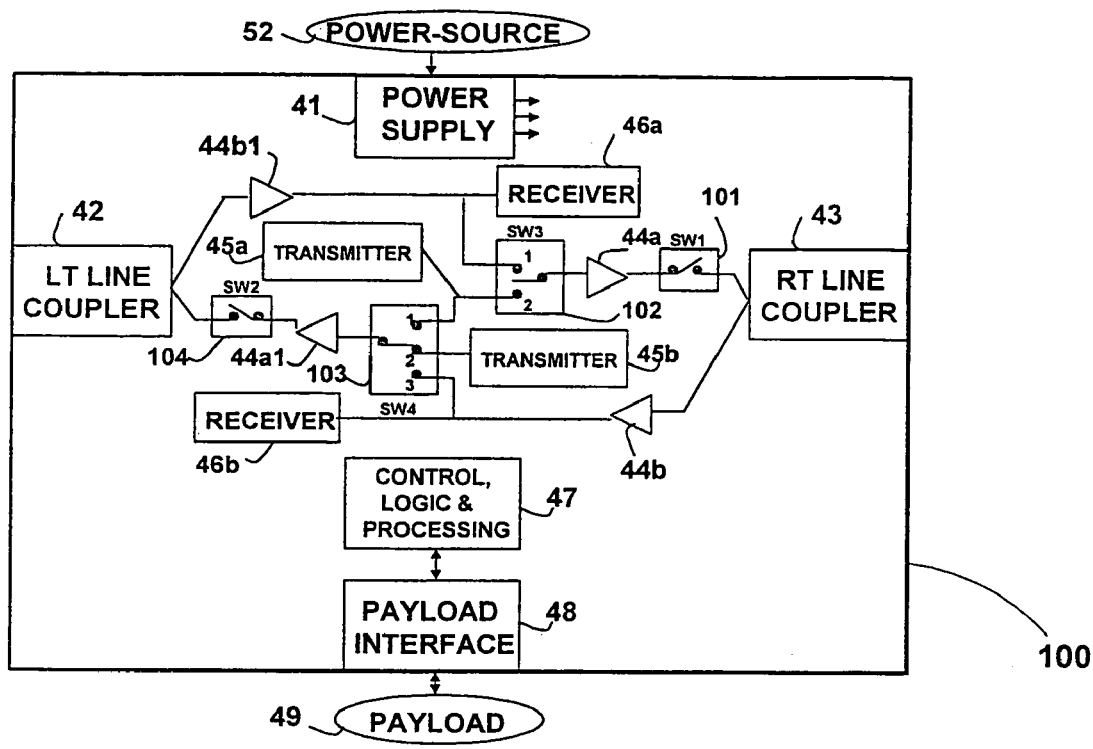
FIG. 10 shows a block diagram of a node according to a preferred embodiment.

FIG. 10 shows a schematic view of a node 100 which is capable of both roles. The state of node 100 is determined by switches 101, 104, 102, and 103, designated SW1, SW2, SW3 and SW4 respectively. These switches are controlled by control, logic, and processing unit 47. Node 100 employs transmitters 45a and 45b, as well as receivers 46a and 46b. Line driver 44a serves the right port, while line driver 44a1 serves the left connection. Similarly, line receivers 44b and 44b1 are connected to the right and left interfaces respectively.

FIG. 12 lists the various possible node states for node 100 (FIG. 10). The states in FIG. 12 are given in a Node State column, and the switch settings are given in SW1, SW2, SW3, and SW4 columns. In a 'Right-to-left' state, data received in the right port is handled by line receiver 44b and fed to line receiver 46b. Simultaneously, the received data is fed to line driver 44a1, which transmits to the left side. Thus, the functionality shown in FIG. 5b is obtained. In a similar way, the 'Left-to-right' state is implemented to achieve a functionality as shown in FIG. 5a. In the latter case, line receiver 46a is the active one.

In the 'transmit both sides' state, transmitter 45a transmits to both ports using line drivers 44a and 44a1, implementing the functionality shown in FIG. 5c. In the 'receive both sides' state, each receiver is connected to single line coupler, and no line driver is activated. This is expected to be the state when the network is idle or as an interim state while switching between states, in order to avoid data collisions caused by two or more transmitters active over the same link.

The 'transmit right receive left' state reflects the state shown in FIG. 9b. Similarly, the 'transmit left receive right' state reflects the functionality shown in FIG. 9a.

In the 'transmit/receive both sides' state, the node can receive and transmit in both interfaces simultaneously, thus implementing the full PSIC Network functionality.

Nodes with More than Two Line Connections

Figure 11:
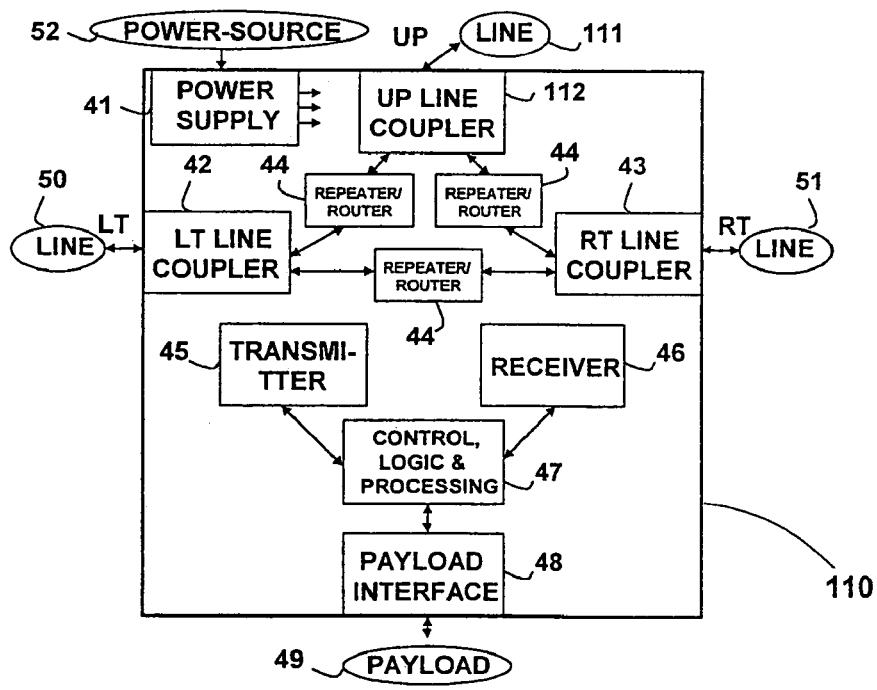
FIG. 11 shows a block diagram of a node according to the present invention, supporting three line couplers.

Whereas the foregoing discussion describes a node having two line couplers (which may be reduced to single interface in the case of an end-unit in a network employing 'bus' topology), it is obvious that three or more such interfaces could also be used. In such a case, at least one additional repeater/router must be added for each additional interface. For example, FIG. 11 illustrates a node 110 having three interfaces, where an additional interface is designated as 'up', and uses a line coupler 112 for interfacing to a line 111. In order to support the interconnection between all three ports, three repeater/router units 44 are used, each constructed as described previously and suitable for connecting two ports. In some applications, where the connectivity requirements can be reduced, any two out of the three ports may be used.

Similarly, additional interfaces can be used. Furthermore, a network can employ nodes of different interface capacities, which can be freely connected to construct a network of arbitrary topology. In all cases, the basic rule that each communication link connect only two nodes must be observed. Furthermore, the network logic embedded in the nodes has to insure that no more than a single node generates data, while all others must be in the transparent repeater/router state, directed from the data-generating node.

Implementation.

Implementing any of the above schemes is straightforward for anyone skilled in the art. In one embodiment, RS-485 (EIA-485) is employed for the physical layer. In such a case, line driver 44a and line receiver 44b are directly implemented using a common RS-485 line driver or line receiver, respectively. Similarly, the switches illustrated in FIG. 10 can be implemented using manually-activated switches, relays, analog switches, or digital switches/multiplexers. Except in the case of manual switches, switching is controlled electronically.

Repeaters and regenerators are known in both prior-art WAN (Wide Area Network) and LAN (Local area network) systems, mainly for the purpose of allowing operation over lengthy connections. However, there are major differences between those networks and the present invention. First, most prior-art repeaters employ single input and single output. The present invention allows for multiple ports. Second, prior-art repeaters are unidirectional, while the present invention is not restricted to a specific direction of data flow. Additionally, the present invention requires a control mechanism (a network controller) for determining the data flow direction, whereas prior-art systems, being unidirectional, do not require such control. In most prior-art networks, units in the network can be clearly defined as either payload-associated units or dedicated repeaters. Such a distinction is not valid when implementing a network according to the present invention, since each payload-associated unit in the network also includes the repeater functionality.

Although a network according to the present invention, when configured in circular topology, can be superficially similar to a. Token-Ring network, there are major differences between them. In a Token-Ring network, there is a single constant direction of data flow. The present invention does not impose single direction of data flow, but the flow may change as part of the network operation. In addition, in Token-Ring networks the data-generating unit is sequentially allocated according to the network topology. In the present invention, the data-generating node need not be chosen according to any specific rule, although sequential selection of the data-generating node is possible.

While the invention has been described with respect to a limited number of embodiments, it will be appreciated that many variations, modifications and other applications of the invention may be made.

What is claimed is:

1. A self-contained device for configuring a network by coupling first and second wiring segments in a building connected for carrying a digital data signal to an analog sensor or actuator, each wiring segment having at least two conductors, the device comprising:
   a first connector for connecting to the first wiring segment;
   a first set of a line driver and a line receiver coupled to said first connector for serial bidirectional communication of a digital data signal with a further first set of a line driver and a line receiver over the first wiring segment;
   a second connector for connecting to the second wiring segment;
   a second set of a line driver and a line receiver coupled to said second connector for serial bidirectional communication of a digital data signal with a further second set of a line driver and a line receiver over the second wiring segment;
   a controller comprising a processor and firmware coupled to said first and second sets; and
   a third connector coupled to said controller and connectable to the analog sensor or actuator, for coupling the digital data signal, carried over the first wiring segment, to the analog sensor or actuator; and
   a single enclosure housing said first and second sets, said controller and said third connector,
   wherein: said device is addressable; said third connector is constructed and connectable for coupling said controller to the analog sensor or actuator; and the analog sensor or actuator is external to said single enclosure.

2. The device according to claim 1, wherein each of the wiring segments is a twisted wire pair or a coaxial cable, and said first and second sets are operative to conduct communication over the wiring segments.

3. The device according to claim 1, wherein the serial digital data is packet-based.

4. The device according to claim 1, further comprising a power supply coupled to said first and second sets for powering said sets, said power supply being coupled to said first connector for being powered by DC power carried over the first wiring segment.

5. The device according to claim 1, wherein said device has a manually assigned address.

6. The device according to claim 1, wherein said device has an automatically assigned address.

7. The device according to claim 1, wherein said device has an address assigned by a data unit connected to said device.

8. The device according to claim 1, further operative to power a second device connected thereto.

9. The device according to claim 1, further operative for powering the analog sensor or actuator when connected to said device.

10. The device according to claim 1, wherein said device is further operative to repeat at least part of the serial digital data received from the first wiring segment to the second wiring segment.

11. The device according to claim 1 further connectable to an analog sensor for measuring a physical phenomenon, wherein the device further comprises an analog to digital converter for converting analog signals from the analog sensor into serial digital data.

12. The device according to claim 1 further connectable to an analog actuator for affecting a physical phenomenon, wherein the device further comprises a digital to analog converter converting serial digital data into analog signals for the analog actuator.

13. A device for use with first and second wiring segments each having two ends and each comprising only two conductors in a point-to-point connection for conducting half-duplex digital data communication of serial digital data, said device comprising:
a first connector for connecting to the first wiring segment;
a first driver coupled to said first connector for transmitting data to the first wiring segment;
a first receiver coupled to said first connector for receiving data from the first wiring segment;
a second connector for connecting to the second wiring segment;
a second driver coupled to receive data from said first receiver and coupled to said second connector for transmitting the data received from said first receiver to the second wiring segment;
a second receiver coupled to said second connector and said first driver for receiving data from the second wiring segment and for passing the data to said first driver;
a component data port coupled to said first driver and to said first receiver for coupling data carried over said first wiring segment to a component;
a control logic coupled to said first and second drivers and said first and second receivers for placing said device in a selected one of first and second states;
a power connection for connecting to a power source;
a power supply including a voltage converter and coupled to said power connection to be powered from the power source, said power supply being coupled to power said first and second drivers, said first and second receivers and said control logic; and
a single enclosure housing said first and second connectors, said first and second drivers, said first and second receivers, said component data port, said control logic, said power connection, and said power supply, wherein:
in the first state, data received from the first wiring segment via said first connector is repeated without format change to the second wiring segment via said second connector,
in the second state, data received from the second wiring segment via said second connector is repeated without format change to the first wiring segment via said first connector, and
each of said first and second connectors has only two connection points for connection to the two conductors of a respective wiring segment.

14. The device according to claim 13, wherein said device is addressable in a network.

15. The device according to claim 13 further for use with a third wiring segment having two ends and comprising only two conductors in a point-to-point connection for conducting half-duplex digital data communication of serial digital data, wherein
said device further comprises a third connector for connecting to the third wiring segment,
said device is further operative in the first state to repeat without format change data received from the first wiring segment via said first connector to the third wiring segment via said third connector, and
said device is further operative in the second state to repeat without format change data received from the second wiring segment via said second connector to the third wiring segment via said third connector.

16. The device according to claim 13, wherein the two conductors of at least one of the wiring segments concurrently carry a power signal over substantially without interfering with data communication, and said power connection is coupled to the power signal via a respective connector for powering at least part of said device.

17. The device according to claim 16, wherein said device is further operative to power at least part of a connected component from the power signal.

18. The device according to claim 13, wherein at least one of the first and second wiring segments is one of a twisted wire pair and a coaxial cable, and respective ones of said connectors, receivers and drivers are adapted for respectively connecting, receiving and transmitting over the at least one of the wiring segments.

19. The device according to claim 13, wherein said device is further operative for analog sensing and control and further comprises an analog port and a converter for converting between analog and digital signals coupled between said analog port and said component data port, and said analog port is couplable to an analog sensor or to an analog actuator constituting one of the components.

20. The device according to claim 19, wherein said device is further operative to carry video or voice signals.

21. The device according to claim 13 wherein said single enclosure further houses a respective connected component.

22. The device according to claim 13 wherein said component data port is a standard DTE interface.

23. The device according to claim 13, wherein said device is further operative to be in a third state in which data received from said component via the component data port is repeated without format change to both the first wiring segment via said first connector and the second wiring segment via said second connector.

24. The device according to claim 13 wherein the two conductors of at least one of the wiring segments concurrently are connected to carry a power signal substantially without interfering with the data communication, and said power connection is further coupled to at least one of said first and second connectors for coupling a power signal from the power source over a connected wiring segment.

25. A device for coupling a data unit to a cable having exactly two ends and including two dedicated wires for carrying a power signal and a single twisted wire pair in a point-to-point connection for carrying half-duplex digital data communication of a serial digital data, the device comprising in a single enclosure:

a wiring connector for connecting to the cable, said wiring connector having a cable connection side consisting of only a first pair of connection points for connection only to the two dedicated wires for carrying a power signal and a only a second pair of connection points for connection only to the single twisted wire pair;

a first driver coupled to said wiring connector for transmitting data to the cable;

a first receiver coupled to said wiring connector for receiving data from the cable;

a data connector for connecting to a data unit for bi-directional standard-based digital data communication with the data unit, for coupling the data unit to said serial digital data;

a second driver coupled to said data connector for transmitting data to the data unit, said second driver being coupled to pass digital data from said first receiver; and a second receiver coupled to said data connector for receiving data from the data unit, said second receiver being coupled to pass data to said first driver, wherein said drivers and receivers are coupled to said wiring connector to be powered from the power signal.

26. The device according to claim 25, wherein said device is addressable in a network.

27. The device according to claim 25, further comprising a power supply including a voltage converter and coupled to said wiring connector to be powered from the power signal, wherein the power supply is coupled to power said drivers and said receivers.

28. The device according to claim 25, further comprising a control logic coupled to said drivers and receivers for placing said device in a selected one of first and second states, wherein:

in the first state, data received from the cable via said wiring connector is repeated without format change to the data unit via said data connector, and in the second state, data received from the data unit via said data connector is repeated without format change to the cable via said wiring connector.

29. The device according to claim 25 wherein said data connector is coupled to pass power from said wiring connector for powering a connected data unit from the power signal.

30. The device according to claim 25, in combination with a single enclosure disposed within the data unit, wherein said device is housed in said enclosure.

31. A device for coupling an analog unit to a cable having exactly two ends and including two dedicated wires for carrying a power signal, and a single twisted wire pair in a point-to-point connection for carrying half-duplex digital data communication of serial digital data, said device comprising:

a wiring connector for connecting to the cable, said wiring connector having a cable connection side consisting of only a first pair of connection points for connection only to the two dedicated wires for carrying a power signal and a only a second pair of connection points for connection only to the single twisted wire pair;

a driver coupled to said wiring connector for transmitting data to the cable;

a receiver coupled to said wiring connector for receiving data from the cable;

an analog connector for connecting to an analog unit;

a converter for converting between analog and digital signals coupled between said analog connector, said receiver and said driver, for coupling the serial digital data to the analog unit; and a single enclosure housing said wiring connector, said driver, said receiver, said analog connector and said converter, wherein said converter, said driver and said receiver are coupled to said wiring connector to be powered from the power signal.

32. The device according to claim 31 wherein the analog unit is a video or voice unit, and the cable is further connected to carry digitized video or digitized voice signals.

33. The device according to claim 31, wherein said device is addressable in a network.

34. The device according to claim 31 wherein the analog unit is an analog sensor for measuring a physical phenomenon, and said converter is an analog to digital converter.

35. The device according to claim 31 wherein the analog unit is an analog actuator for producing a physical phenomenon, and said converter is a digital to analog converter.

36. The device according to claim 31 further comprising a power supply including a voltage converter and coupled to said wiring connector to be powered from the power signal, said power supply being coupled to power said driver, said receiver and said converter.

37. The device according to claim 31 further comprising a control logic coupled to said driver and said receiver for placing said device in a selected one of first and second states, wherein:

in the first state, data received from the cable via said wiring connector is converted to analog form and passed to the analog unit via said analog connector, and in the second state, an analog signal received from the analog unit via said analog connector is digitized and passed to the cable via said wiring connector.

38. The device according to claim 31 wherein said analog connector is coupled to pass power from said wiring connector for powering a connected analog unit from the power signal.

39. The device according to claim 31, in combination with a single enclosure disposed within the analog unit, wherein said device is housed in said enclosure.

40. A device for coupling to a power signal and a full-duplex serial digital data signal simultaneously carried over an Ethernet-based local area network (LAN) cable comprising at least one twisted-wire pair, said device comprising:

a LAN wiring connector for connecting to the cable;

a power/data splitter having first, second and third ports, said splitter being configured so that only the power signal is passed from said first port to said second port, and only the digital data signal is passed between said first and third ports, and wherein said first port is coupled to said LAN wiring connector;

a LAN transceiver coupled to said third port of said power/data splitter for point-to-point communication of the full duplex serial digital data signal with a transceiver of the same type as said LAN transceiver over said LAN cable;

a power supply for voltage conversion coupled to and powered from said second port of said power/data splitter, said power supply having a power source port connected to said LAN transceiver for powering said LAN transceiver from said power supply;

a data port coupled to said LAN transceiver and connectable to a data unit for coupling the packet-based full-duplex serial digital data signal to the data unit; and a visual indicator powered by said power supply for indicating the device status, wherein said device is addressable in the LAN.

41. The device according to claim 40, wherein said device has a manually assigned address.

42. The device according to claim 40, wherein said device has an automatically assigned address.

43. The device according to claim 40, wherein said device has an address assigned by the data unit.

44. The device according to claim 40 wherein:
the data unit is a wired digital data unit;
said data port comprises a digital data connector connectable to the wired digital data unit; and
said device further comprises a further transceiver coupled between said LAN transceiver and said digital data connector for bi-directional digital data communication with the wired digital data unit.

45. The device according to claim 44 wherein the communication with the wired digital data unit is full duplex standard serial communication.

46. The device according to claim 40 further comprising firmware and a processor executing said firmware, and wherein said processor is coupled to said LAN transceiver for controlling said LAN transceiver.

47. The device according to claim 40, wherein said device is further operative to power the data unit and said data port is coupled to said power supply for powering the connected data unit therefrom.

48. The device according to claim 40, wherein said device is further operative for sensing a physical phenomenon, wherein the data unit is an analog sensor for sensing a physical phenomenon, and said device further comprises an analog to digital converter coupled between said data port and said LAN transceiver for converting analog signals to digital signals.

49. The device according to claims 48, wherein the digital data signal contains digitized audio or video data, and the sensor is an audio or video device.

50. The device according to claim 40, wherein said device is further operative for producing a physical phenomenon, wherein the data unit is an analog actuator for producing the physical phenomenon, and wherein said device further comprises a digital to analog converter coupled between said data port and said LAN transceiver for converting digital signals to analog signals.

51. The device according to claim 50, wherein the digital data signal contains digitized audio or video data, and the actuator is an audio or video device.

52. The device according to claim 40 further enclosed in a single enclosure with the data unit coupled to said device.

53. A control device for coupling a component to first and second wiring segments of a local area network (LAN), each segment having two ends and comprising a twisted-wire pair having two conductors arranged in a point-to-point connection for carrying unidirectional digital data communication of serial digital data, said device comprising:

a first LAN connector for connecting to the first LAN wiring segment;

a first signal transformer coupled to said first LAN connector for passing only data signals;

a receiver coupled to said first signal transformer for receiving data signals passed by said first signal transformer and decoding data in the received signals;

a second LAN connector for connecting to the second wiring segment;

a second signal transformer coupled to said second LAN connector for passing only data signals;

a driver coupled to said second signal transformer for encoding and transmitting data to said second signal transformer;

a component data port coupled to said driver and to said receiver for coupling data carried over at least one of the wiring segments to a component;

a power connection for connecting to a power source;

a power supply including a voltage converter and coupled to said power connection to be powered from the power source, said power supply being coupled to power at least said driver and said receiver; and a single enclosure housing said first and second LAN connectors, said first and second signal transformers, said receiver, said driver, said component data port, said power connection and said power supply, wherein at least part of the data received from the first wiring segment via said first connector is repeated without format change to the second wiring segment via said second connector.

54. The control device according to claim 53, further comprising a CRC error detector coupled to said receiver and a CRC generator coupled to said transmitter for responding to errors.

55. The control device according to claim 53, wherein said device is addressable in a network.

56. The control device according to claim 53 further for use with a third wiring segment in the local area network (LAN), the third wiring segment having two ends and comprising a twisted-pair having two conductors in a point-to-point connection for carrying unidirectional digital data communication of serial digital data, said device further comprising a third connector for connecting to the third wiring segment, and wherein said device is further operative to repeat without format change data received from the first wiring segment via said first connector to said the wiring segment via said third connector.

57. The control device according to claim 53, wherein the two conductors of at least one of the wiring segments concurrently carry a power signal substantially without interfering with the data communication, and said power connection is coupled to the power signal via a respective one of said connectors for powering at least part of said control device.

58. The control device according to claim 57, wherein said device is further operative to power at least part of a connected component from the power signal.

59. The control device according to claim 53, wherein:
said device is further operative for analog sensing and control;
said device further comprises an analog port and a converter for converting between analog and digital signals coupled between said analog port and said component data port; and said analog port is couplable to an analog sensor or to an analog actuator.

60. The control device according to claim 59, wherein said device is further operative to carry video or voice signals.

61. The control device according to claim 53, in combination with a single enclosure disposed within a component that is to be coupled to one of the wiring segments, wherein said device is housed in said enclosure.

62. The control device according to claim 53 wherein said component data port is a standard DTE interface.

63. The control device according to claim 53, wherein the two conductors of at least one of the wiring segments are connected to concurrently carry a power signal substantially without interfering with the data communication, and said device further couples said power connection to at least one of said first and second connectors for coupling the power signal from the power source over a connected wiring segment.

64. The control device according to claim 53 further comprising a visual indicator powered by said power supply for indicating the device status.

65. The control device according to claim 53, wherein said device is further operative to communicate with an identical device connected to the other end of one of the wiring segments.

* * * * *